United States Patent
Samuel et al.

(10) Patent No.: US 11,841,694 B2
(45) Date of Patent: Dec. 12, 2023

(54) PREDICTING DRILLING TOOL FAILURE

(71) Applicant: LANDMARK GRAPHICS CORPORATION, Houston, TX (US)

(72) Inventors: Robello Samuel, Cypress, TX (US); Aravind Prabhakar, Houston, TX (US); Christopher Neil Marland, Spring, TX (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 773 days.

(21) Appl. No.: 17/004,834

(22) Filed: Aug. 27, 2020

(65) Prior Publication Data
US 2020/0409334 A1  Dec. 31, 2020

Related U.S. Application Data

(63) Continuation of application No. 15/574,779, filed as application No. PCT/US2015/038820 on Jul. 1, 2015, now Pat. No. 10,877,462.

(51) Int. Cl.
*E21B 44/00* (2006.01)
*G05B 19/4065* (2006.01)

(52) U.S. Cl.
CPC .......... *G05B 19/4065* (2013.01); *E21B 44/00* (2013.01)

(58) Field of Classification Search
CPC .............................. G05B 19/4065; E21B 44/00
See application file for complete search history.

(56) References Cited

U.S. PATENT DOCUMENTS

| | | | |
|---|---|---|---|
| 2005/0010382 A1* | 1/2005 | Oliver | E21B 10/00 702/9 |
| 2005/0071120 A1* | 3/2005 | Hutchinson | E21B 44/00 702/150 |
| 2010/0082256 A1* | 4/2010 | Mauldin | E21B 12/02 702/9 |
| 2012/0130693 A1* | 5/2012 | Ertas | E21B 44/00 703/2 |
| 2014/0338977 A1* | 11/2014 | Oueslati | E21B 41/00 175/45 |
| 2015/0160101 A1 | 6/2015 | Gao et al. | |

FOREIGN PATENT DOCUMENTS

WO  2013126955 A1  9/2013

OTHER PUBLICATIONS

International Search Report and Written Opinion; PCT Application No. PCT/US2015/038820; dated Mar. 31, 2016.

* cited by examiner

*Primary Examiner* — Kibrom K Gebresilassie
(74) *Attorney, Agent, or Firm* — Polsinelli PC (57) ABSTRACT

Systems and methods for predicting drilling tool failure based on an analysis of at least one of a plot of jerk and inverse jerk for the drilling tool and a plot of drilling tool failure pattern trends data.

20 Claims, 7 Drawing Sheets

PREDICTING DRILLING TOOL FAILURE

CROSS-REFERENCE TO RELATED APPLICATIONS

This application is a Continuation Application which claims benefit to U.S. National Phase application Ser. No. 15/574,779, filed Nov. 16, 2017, Now patent Ser. No. 10/877,462, which claims benefit to national stage entry of PCT/US2015/038820 filed Jul. 1, 2015, said application is expressly incorporated herein in its entirety.

FIELD OF THE DISCLOSURE

The present disclosure generally relates to systems and methods for predicting drilling tool failure. More particularly, the present disclosure relates to systems and methods for predicting drilling tool failure based on an analysis of at least one of a plot of jerk and inverse jerk for the drilling tool and a plot of drilling tool failure pattern trends data.

BACKGROUND

Various industries have analyzed jerk information for determining and/or monitoring sudden movements in a tool or device. And, some of these industries have used the jerk information to control movement of the tool or device. None, however, are known to use the jerk information to predict failure of the tool or device. And, none are known to use the jerk information with drilling tool failure pattern trends data to predict failure of the tool or device. Current techniques for predicting drilling tool failure based solely on an analysis of drilling tool failure pattern trends data leave room for improvement of accuracy and resources used.

BRIEF DESCRIPTION OF THE DRAWINGS

The present disclosure is described below with references to the accompanying drawings in which like elements are referenced with like reference numerals, and in which.

DETAILED DESCRIPTION OF THE PREFERRED EMBODIMENTS

The present disclosure overcomes one or more deficiencies in the prior art by providing systems and methods for predicting drilling tool failure based on an analysis of at least one of a plot of jerk and inverse jerk for the drilling tool and a plot of drilling tool failure pattern trends data.

In one embodiment, the present disclosure includes a method for a method for predicting drilling tool failure, which comprises: i) computing one or more jerk values for a drilling tool using accelerometer data and a computer processor; ii) computing one or more inverse jerk values for the drilling tool using a respective jerk value and the computer processor; iii) plotting the one or more jerk values and the one or more inverse jerk values on a graph relative to a time; iv) determining failure threshold limits for the drilling tool based on the graph; v) plotting the failure threshold limits and warning thresholds for the drilling tool on the graph relative to a time; and vi) predicting drilling tool failure using the graph with the failure threshold limits and warning thresholds.

In another embodiment, the present disclosure includes a non-transitory program carrier device tangibly carrying computer executable instructions for predicting drilling tool failure, the instructions being executable to implement: i) computing one or more jerk values for a drilling tool using accelerometer data; ii) computing one or more inverse jerk values for the drilling tool using a respective jerk value; iii) plotting the one or more jerk values and the one or more inverse jerk values on a graph relative to a time (t); iv) determining failure threshold limits for the drilling tool based on the graph; v) plotting the failure threshold limits and warning thresholds for the drilling tool on the graph relative to a time; and vi) predicting drilling tool failure using the graph with the failure threshold limits and warning thresholds.

In yet another embodiment, the present disclosure includes a non-transitory program carrier device tangibly carrying computer executable instructions for predicting drilling tool failure, the instructions being executable to implement: i) computing one or more jerk values for a drilling tool using accelerometer data; ii) computing one or more inverse jerk values for the drilling tool using a respective jerk value; iii) plotting the one or more jerk values and the one or more inverse jerk values on a graph relative to a time; iv) determining failure threshold limits for the drilling tool based on the graph; v) plotting the failure threshold limits and warning thresholds for the drilling tool on the graph relative to a time; and vi) adjusting drilling operations based on the failure threshold limits and warning thresholds.

The subject matter of the present disclosure is described with specificity, however, the description itself is not intended to limit the scope of the disclosure. The subject matter thus, might also be embodied in other ways, to include different structures, steps and/or combinations similar to those described herein in conjunction with other present or future technologies. Moreover, although the term "step" may be used herein to describe different elements of methods employed, the term should not be interpreted as implying any particular order among or between various steps herein disclosed unless otherwise expressly limited by the description to a particular order. While the present disclosure is described in connection with the oil and gas industry, it is not limited thereto and may also be applied in other drilling industries (e.g. drilling water wells) and various others outside of drilling to predict failure of a tool or device.

Method Description

Figure 1A:
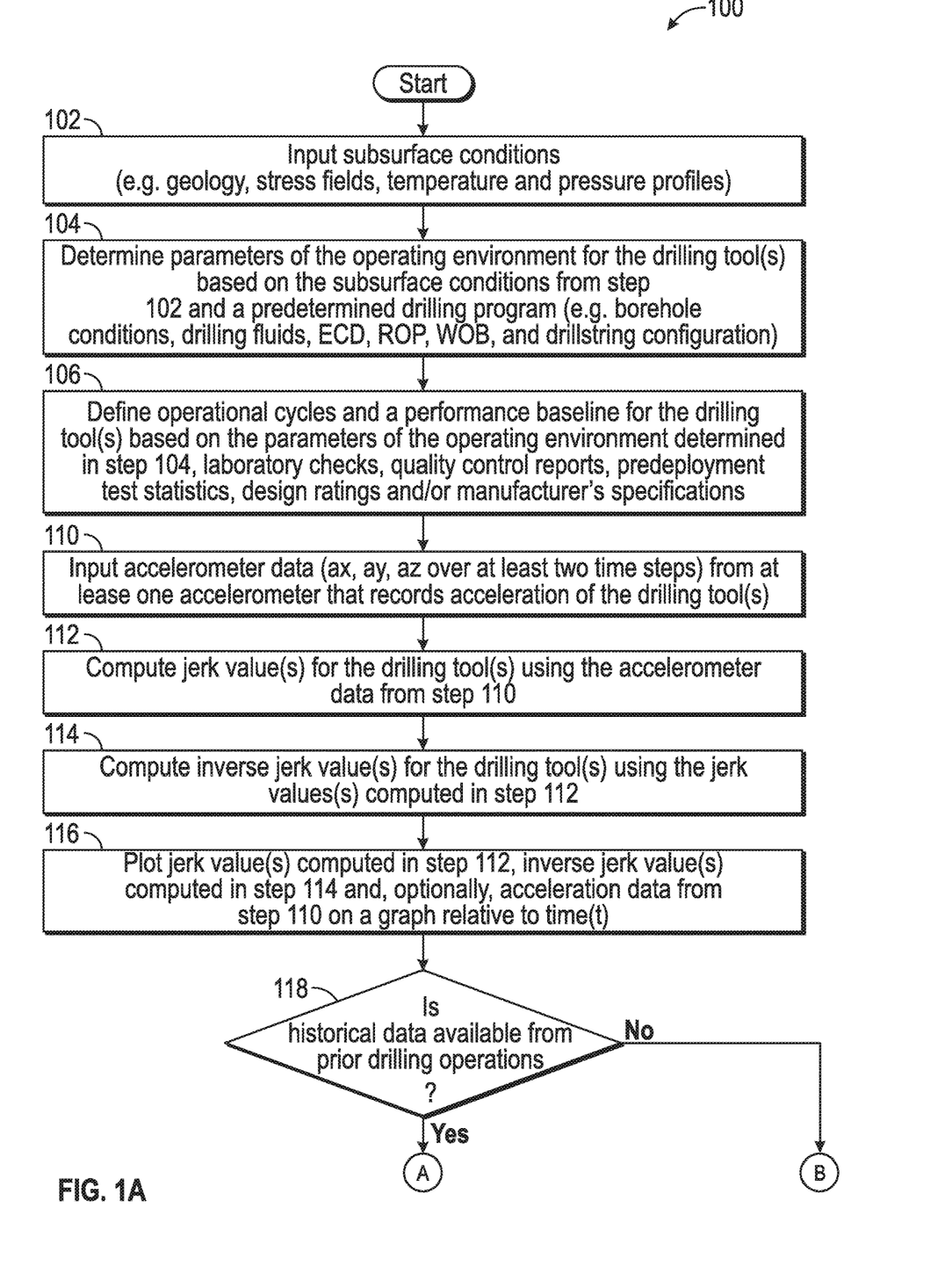
FIGS. 1A-1B are a flow diagram illustrating one embodiment of a method for implementing the present disclosure.
Figure 1B:
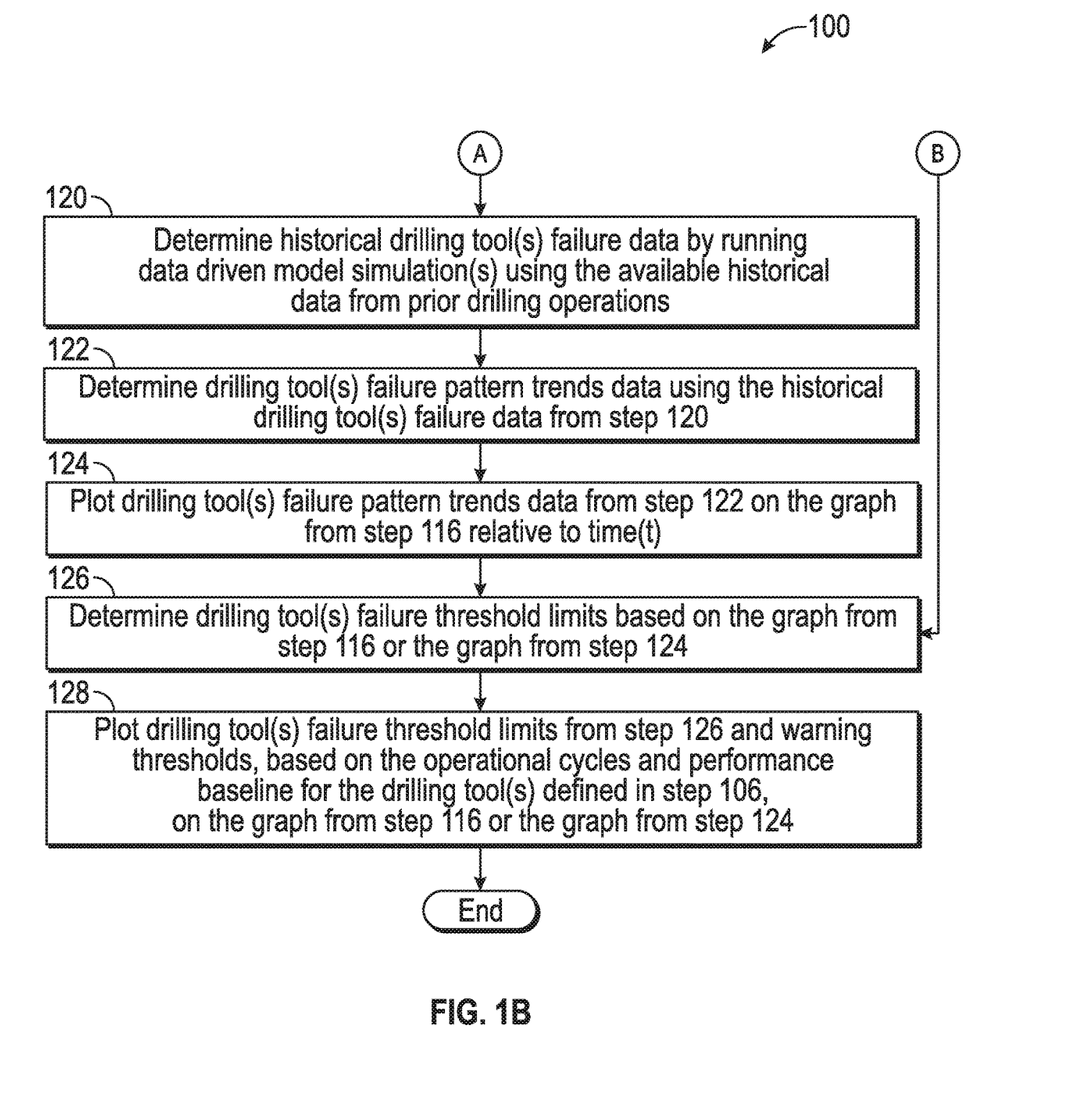

Referring now to FIGS. 1A-1B, a flow diagram illustrates one embodiment of a method 100 for implementing the present disclosure. The method 100 is useful for predicting drilling tool failure based on an analysis of at least one of a plot of jerk and inverse jerk for the drilling tool and a plot of drilling tool failure pattern trends data. Mathematically, jerk, the derivate of acceleration, represents the infinitesimal rate of change of acceleration. And, inverse jerk is simply the reciprocal of jerk. Based on acceleration values recorded by down-hole accelerometers, jerk and inverse jerk values can be calculated. Values of jerk and inverse jerk can be computed along all three coordinates of the Cartesian system based on corresponding timed readings obtained from the accelerometer(s). The lateral component Mt) and torsional component $J_y(t)$ of jerk provide significant contribution to tool failure in comparison with the axial jerk component $J_x(t)$. The axial component of jerk corresponds to the accelerometer readings obtained along the x coordinates of the of the down-hole measurement. The torsional and lateral components of jerk correspond to the accelerometer readings obtained along the y coordinates and the z coordinates, respectively, of the of the down-hole measurement. For the sake of accuracy, evaluation must be done independently for the axial, torsional, and lateral components of jerk, along with the cumulative jerk.

Figure 6:
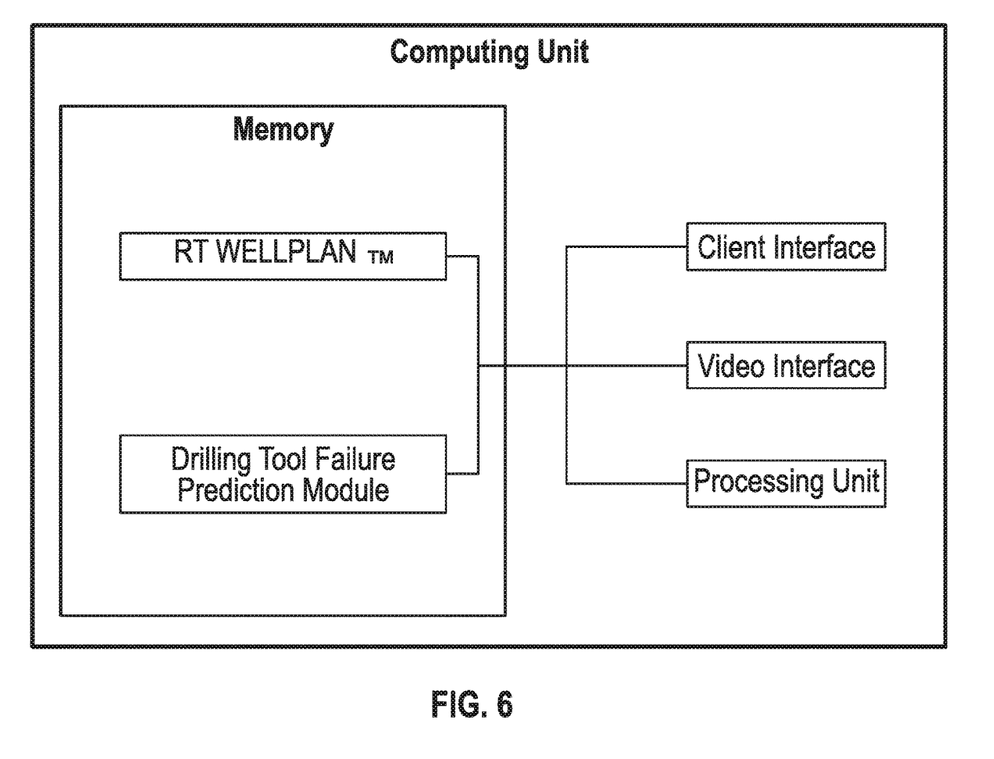
FIG. 6 is a block diagram illustrating one embodiment of a computer system for implementing the present disclosure.

In step 102, subsurface conditions (e.g. geology, stress fields (e.g. Andersonian stress distribution mapping, tracing directions and magnitudes of principal stresses ($\sigma_H$, $\sigma_h$ and $\sigma_v$), temperature and pressure profiles) are input for the drilling tool(s) using the client interface and/or the video interface described further in reference to FIG. 6. Lithological properties of the formation (including presence of corrosive gases like $H_2S$) are thus, considered because corrosive environments can potentially bring down tool performance.

In step 104, parameters of the operating environment for the drilling tool(s) are determined based on the subsurface conditions from step 102 and a predetermined drilling program that may include, for example, borehole conditions, drilling fluids (e.g. mud additives and mud rheology), Equivalent Circulating Density (ECD), Rate Of Penetration (ROP), Weight On Bit (WOB), drill-string configuration, bit selection based on rock hardness, and miscellaneous pertinent operational conditions. Certain aspects of the subsurface conditions may change due to the presence of a borehole and the drilling program. The parameters of the operating environment for the drilling tool(s) are determined using techniques well known in the art to match the predetermined drilling program and the subsurface conditions from step 102, which may include, for example, borehole conditions, drilling fluids (e.g. mud additives and mud rheology), ECD, ROP, WOB, drill-string configuration, and bit selection based on rock hardness.

In step 106, operational cycles and a performance baseline are defined for the drilling tool(s) based on the parameters of the operating environment determined in step 104, laboratory checks, quality control reports, pre-deployment test statistics, design ratings and/or manufacturer specifications. The operational cycles and performance baseline are defined using techniques well known in the art and may include, for example, drilling tool usage operation time, mechanical loading and/or lithological effects. The design life of each drilling tool is specified by the manufacturer based on certain established experimental parameters/test conditions (some of which are laboratory based) and may not be indicative of the actual tool life given the challenging subsurface conditions.

In step 110, accelerometer data (ax, ay, az over at least two time steps) may be input automatically and/or manually, using the client interface and/or the video interface described further in reference to FIG. 6, from at least one accelerometer that records acceleration of the drilling tool(s). The accelerometer is a sensor attached to the drill-string in proximity with the drilling tool(s). The accelerometer data may be real-time data from an accelerometer used in current drilling operations and/or historical data obtained from another accelerometer used under similar operating conditions. Historical data may be used to facilitate planning before drilling and to supplement real-time data that may be available in the future. In Table 1 below, exemplary accelerometer data is shown at various time steps along each axis (x coordinates, y coordinates, z coordinates).

In step 112, jerk value(s) for the drilling tool(s) are computed using the accelerometer data from step 110 and the following equations for axial jerk $J_x(t)$, torsional jerk $J_y(t)$ and lateral jerk $J_z(t)$:

$$J_{x_n}(t) = \frac{a_{x_n} - a_{x_{n-1}}}{t_{x_n} - t_{x_{n-1}}}$$

$$J_{y_n}(t) = \frac{a_{y_n} - a_{y_{n-1}}}{t_{y_n} - t_{y_{n-1}}}$$

$$J_{z_n}(t) = \frac{a_{z_n} - a_{z_{n-1}}}{t_{z_n} - t_{z_{n-1}}}$$

In Table 1 below, exemplary jerk values, based on the accelerometer data at corresponding time steps, are shown for axial jerk $J_x(t)$, torsional jerk $J_y(t)$ and lateral jerk $J_z(t)$.

In step 114, inverse jerk value(s) for the drilling tool(s) are computed using the jerk value(s) computed in step 112 and the following equations for inverse axial jerk $J_x(t)-1$, inverse torsional jerk $J_y(t)-1$ and inverse lateral jerk $J_z(t)-1$:

$$J_{x_n}(t)^{-1} = \frac{1}{J_{x_n}(t)}$$

$$J_{y_n}(t)^{-1} = \frac{1}{J_{y_n}(t)}$$

$$J_{z_n}(t)^{-1} = \frac{1}{J_{z_n}(t)}$$

In Table 1 below, exemplary inverse jerk values, based on the jerk values at corresponding time steps, are shown for inverse axial jerk $J_x(t)$, inverse torsional jerk $J_y(t)$ and inverse lateral jerk $J_z(t)$.

TABLE 1

| TIME | ACCELERATION | | | JERK | | | JERK$^{-1}$ | | |
|---|---|---|---|---|---|---|---|---|---|
| | x | y | z | Jx(t) | Jy(t) | Jz(t) | $J_x(t)^{-1}$ | $J_y(t)^{-1}$ | $J_z(t)^{-1}$ |
| t1 | $a_{x1}$ | $a_{y1}$ | $a_{z1}$ | . | . | . | | | |
| t2 | $a_{x2}$ | $a_{y2}$ | $a_{z2}$ | $J_{x2}$ | $J_{y2}$ | $J_{z2}$ | $J_{x2}^{-1}$ | $J_{y2}^{-1}$ | $J_{z2}^{-1}$ |

TABLE 1-continued

| TIME | ACCELERATION | | | JERK | | | JERK$^{-1}$ | | |
| --- | --- | --- | --- | --- | --- | --- | --- | --- | --- |
| | x | y | z | Jx(t) | Jy(t) | Jz(t) | $J_x(t)^{-1}$ | $J_y(t)^{-1}$ | $J_z(t)^{-1}$ |
| t3 | $a_{x3}$ | $a_{y3}$ | $a_{z3}$ | $J_{x3}$ | $J_{y3}$ | $J_{z3}$ | $J_{x3}^{-1}$ | $J_{y3}^{-1}$ | $J_{z3}^{-1}$ |
| t4 | $a_{x4}$ | $a_{y4}$ | $a_{z4}$ | $J_{x4}$ | $J_{y4}$ | $J_{z4}$ | $J_{x4}^{-1}$ | $J_{y4}^{-1}$ | $J_{z4}^{-1}$ |
| t5 | $a_{x5}$ | $a_{y5}$ | $a_{z5}$ | $J_{x5}$ | $J_{y5}$ | $J_{z5}$ | $J_{x5}^{-1}$ | $J_{y5}^{-1}$ | $J_{z5}^{-1}$ |
| t6 | $a_{x6}$ | $a_{y6}$ | $a_{z6}$ | $J_{x6}$ | $J_{y6}$ | $J_{z6}$ | $J_{x6}^{-1}$ | $J_{y6}^{-1}$ | $J_{z6}^{-1}$ |
| t7 | $a_{x7}$ | $a_{y7}$ | $a_{z7}$ | $J_{x7}$ | $J_{y7}$ | $J_{z7}$ | $J_{x7}^{-1}$ | $J_{y7}^{-1}$ | $J_{z7}^{-1}$ |
| t8 | $a_{x8}$ | $a_{y8}$ | $a_{z8}$ | $J_{x8}$ | $J_{y8}$ | $J_{z8}$ | $J_{x8}^{-1}$ | $J_{y8}^{-1}$ | $J_{z8}^{-1}$ |
| t9 | $a_{x9}$ | $a_{y9}$ | $a_{z9}$ | $J_{x9}$ | $J_{y9}$ | $J_{z9}$ | $J_{x9}^{-1}$ | $J_{y9}^{-1}$ | $J_{z9}^{-1}$ |
| ... | ... | ... | ... | ... | ... | ... | ... | ... | ... |
| ... | ... | ... | ... | ... | ... | ... | ... | ... | ... |
| tn | $a_{xn}$ | $a_{yn}$ | $a_{zn}$ | $J_{xn}$ | $J_{yn}$ | $J_{zn}$ | $J_{xn}^{-1}$ | $J_{yn}^{-1}$ | $J_{zn}^{-1}$ |

Figure 2:
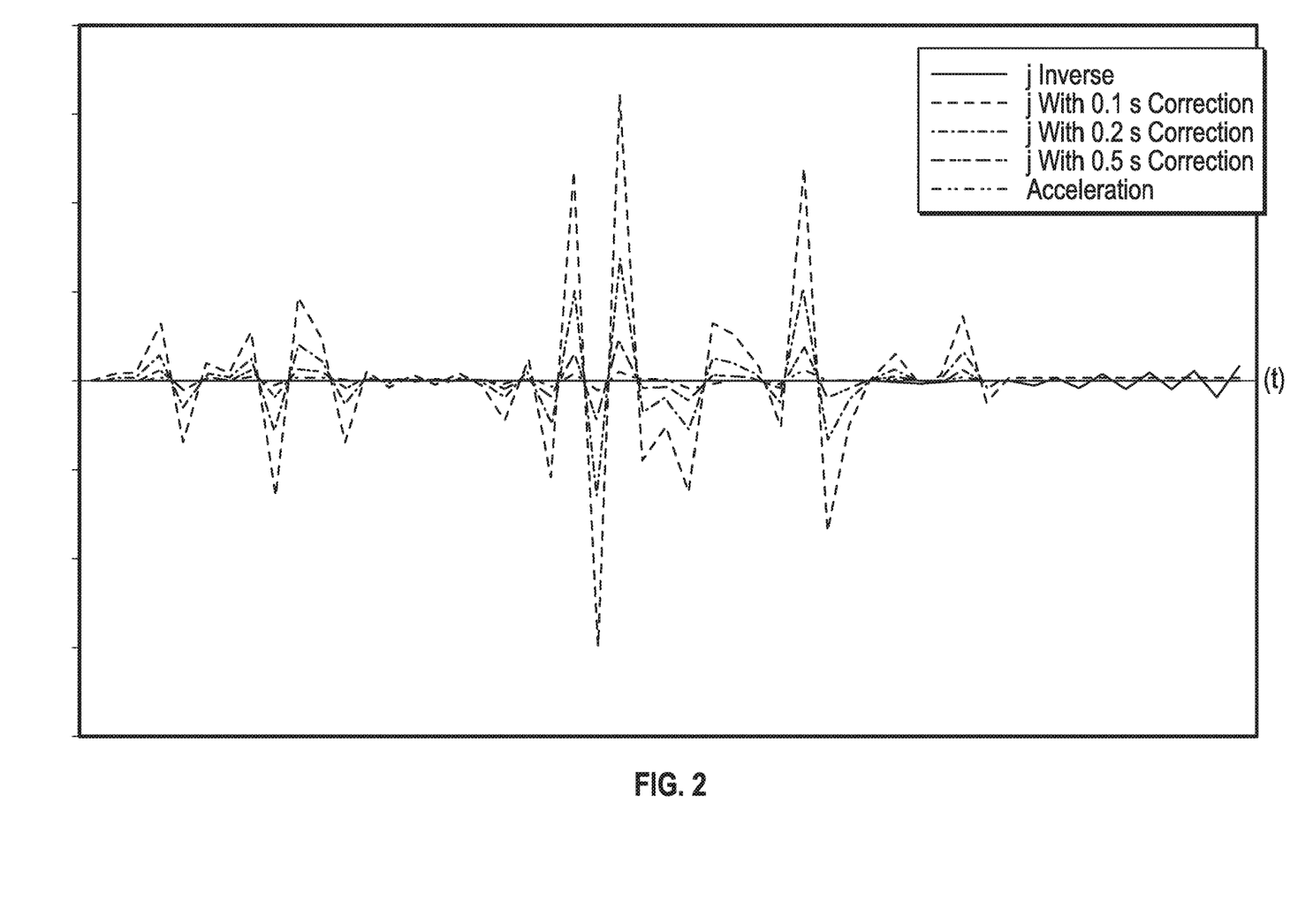
FIG. 2 is a graph illustrating an exemplary plot of accelerometer data (acceleration), inverse jerk (j inverse) values and jerk (j) values (incorporating time-lag correction factors) relative to time (t) in step 116 of FIG. 1A.

In step 116, the jerk value(s) computed in step 112, the inverse jerk value(s) computed in step 114 and, optionally, the accelerometer data from step 110 are plotted on a graph relative to time (t) wherein $t(x)=(tx_n+tx_{n-1})/2$; $t(y)=(ty_n+ty_{n-1})/2$; and $t(z)=(tz_n+tz_{n-1})/2$ In FIG. 2, a graph illustrates an exemplary plot of accelerometer data (acceleration), inverse jerk (j inverse) values and jerk (j) values (incorporating time-lag correction factors) relative to time (t). In order to facilitate advanced pattern recognition, time-lag correction factors can be incorporated to account for errors due to measurement complexities down-hole, signal distortions, noise, and time lag, for example. After incorporating any required time-lag correction factors, new plots accounting for diverse scenarios can be super-imposed over one another to further study failure patterns as illustrated in FIG. 2.

In step 118, the method 100 determines if there is any historical data available from prior drilling operations such as, for example, prior tool failure logs, the root causes that triggered tool failure, the operating cycles of tools before failure, formation properties, drilling parameters, subsurface conditions, historical acceleration readings, operational parameters, unforeseen event circumstances and/or any other related data that can be used in a data driven model. Historical data may be obtained from previously drilled neighboring wells within geologically similar areas. If there is not any historical data available from prior drilling operations, then the method 100 proceeds to step 126. Otherwise, the method 100 proceeds to step 120.

Figure 3:
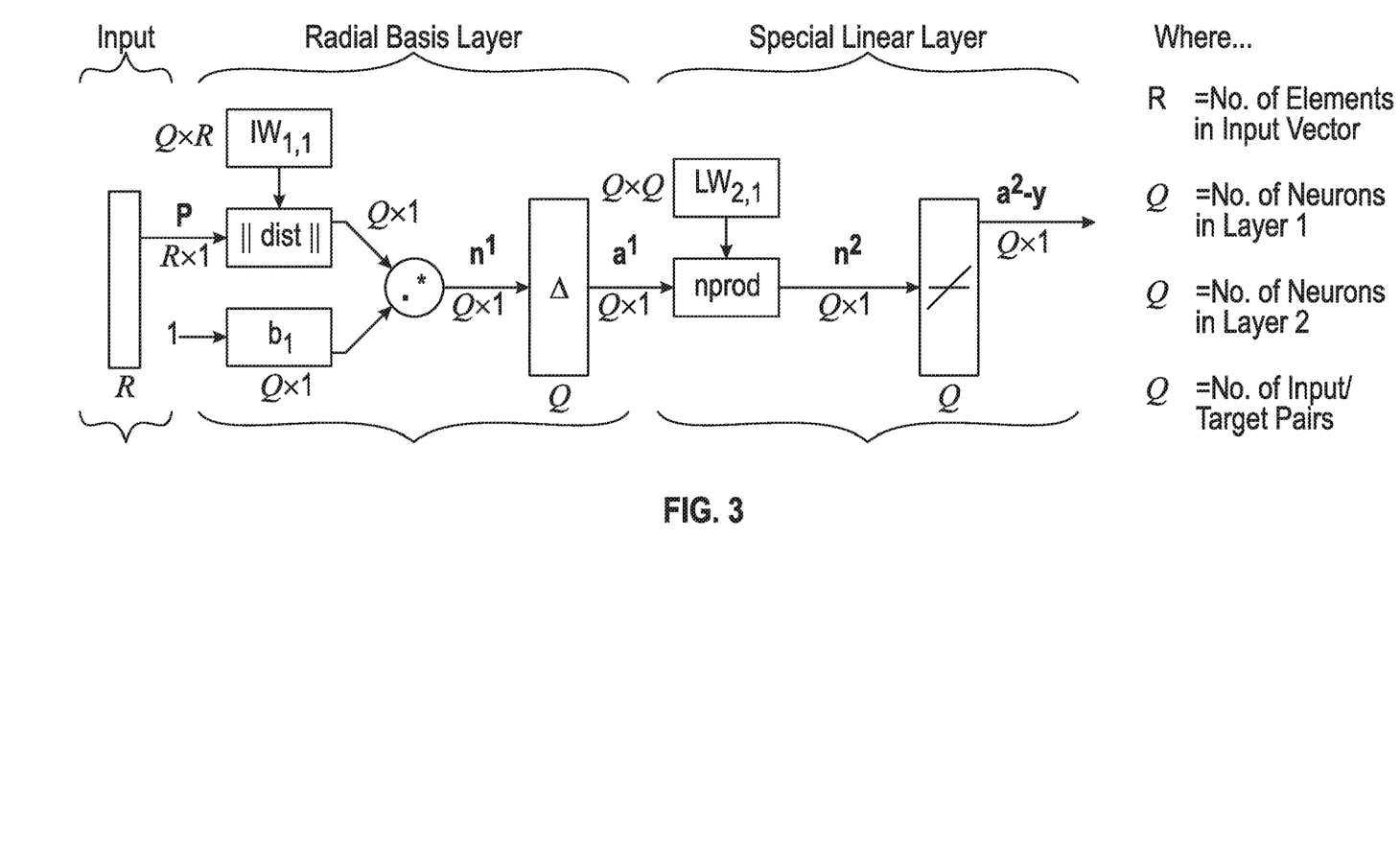
FIG. 3 is a schematic diagram illustrating an exemplary data driven model, which may be used in step 120 of FIG. 1B.

In step 120, historical drilling tool(s) failure data is determined by running data driven model simulation(s) using the historical data available from prior drilling operations. Historical data from prior drilling operations therefore, may be used to improve the accuracy of the method 100 in predicting drilling tool failure. The data driven model simulation(s) may be performed on a single, preferred, data driven model or a strategic combination of data driven models. Examples of well-known data driven models include Neural Networks, Fuzzy Rule-Based Systems, Support Vector Machines and Generalized Regression Neural Networks like that illustrated in FIG. 3. The input, which is the historical data available from prior drilling operations, is used to run the data driven model simulation(s) that determine the historical drilling tool(s) failure data.

In step 122, drilling tool(s) failure pattern trends data is determined using the historical drilling tool(s) failure data from step 120 and techniques well-known in the art for recognizing drilling tool(s) failure pattern trends.

In step 124, the drilling tool(s) failure pattern trends data from step 122 is plotted on the graph from step 116 relative to time (t) wherein $t(x)=(tx_n+tx_{n-1})/2$; $t(y)=(ty_n+ty_{n-1})/2$; and $t(z)=(tz_n+tz_{n-1})/2$.

Figure 4A:
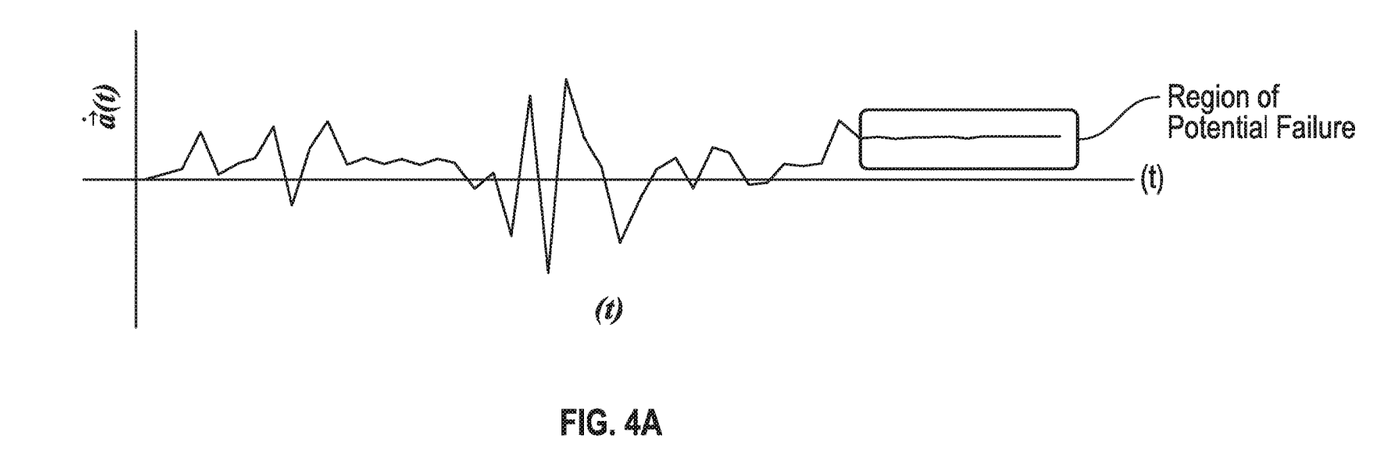
FIG. 4A is a graph illustrating an exemplary plot of accelerometer data relative to time (t) referred to in step 126 of FIG. 1B.
Figure 4B:
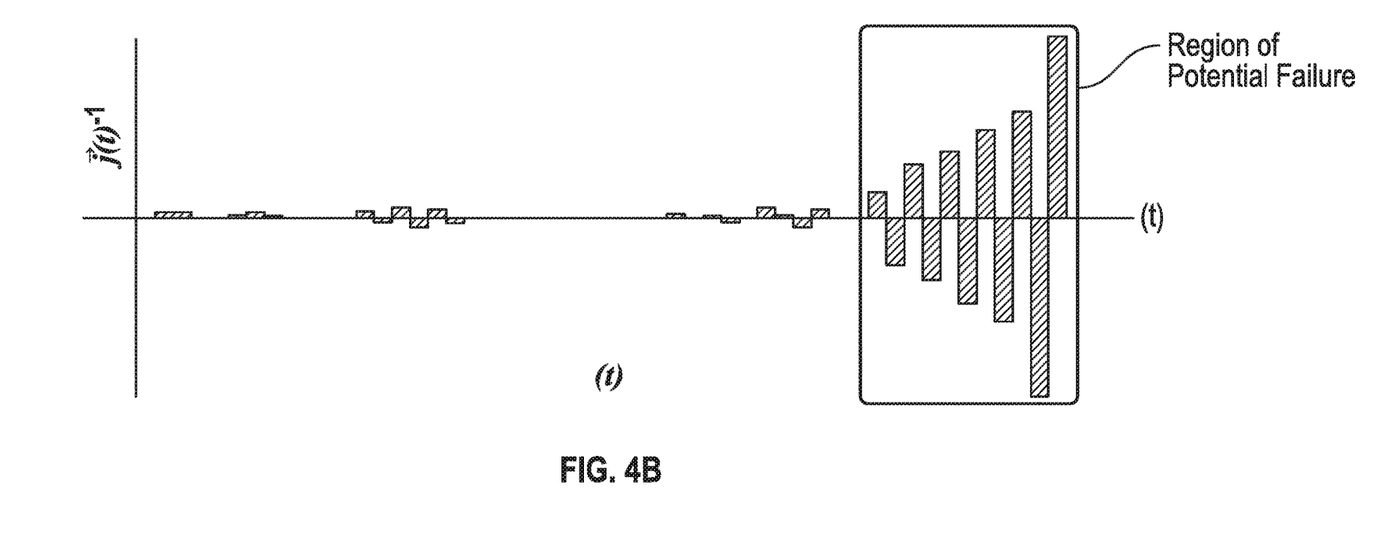
FIG. 4B is a graph illustrating an exemplary plot of inverse jerk values relative to time (t) referred to in step 126 of FIG. 1B.

In step 126, drilling tool(s) failure threshold limits are determined based on the graph from step 116 (if historical data is not available from prior drilling operations) or the graph from step 124 (if historical data is available from prior drilling operations) and techniques well known in the art. In FIG. 4A, a graph illustrates an exemplary plot of accelerometer data relative to time (t). In FIG. 4B, a graph illustrates an exemplary plot of inverse jerk values relative to time (t). The circled region in FIGS. 4A-4B illustrates where the drilling tool is close to failure. The graph in FIG. 4A illustrates an early sign of tool failure that may go undetected because the accelerometer data shown in the circled region may look like a straight line when it is not and includes micro-variations. The graph in FIG. 4B, however, illustrates notable fluctuations of the inverse jerk values in the circled region that vary progressively in ascending/descending magnitudes until a peak is reached at which point in time the drilling tool will fail if drilling operations continue.

Figure 5:
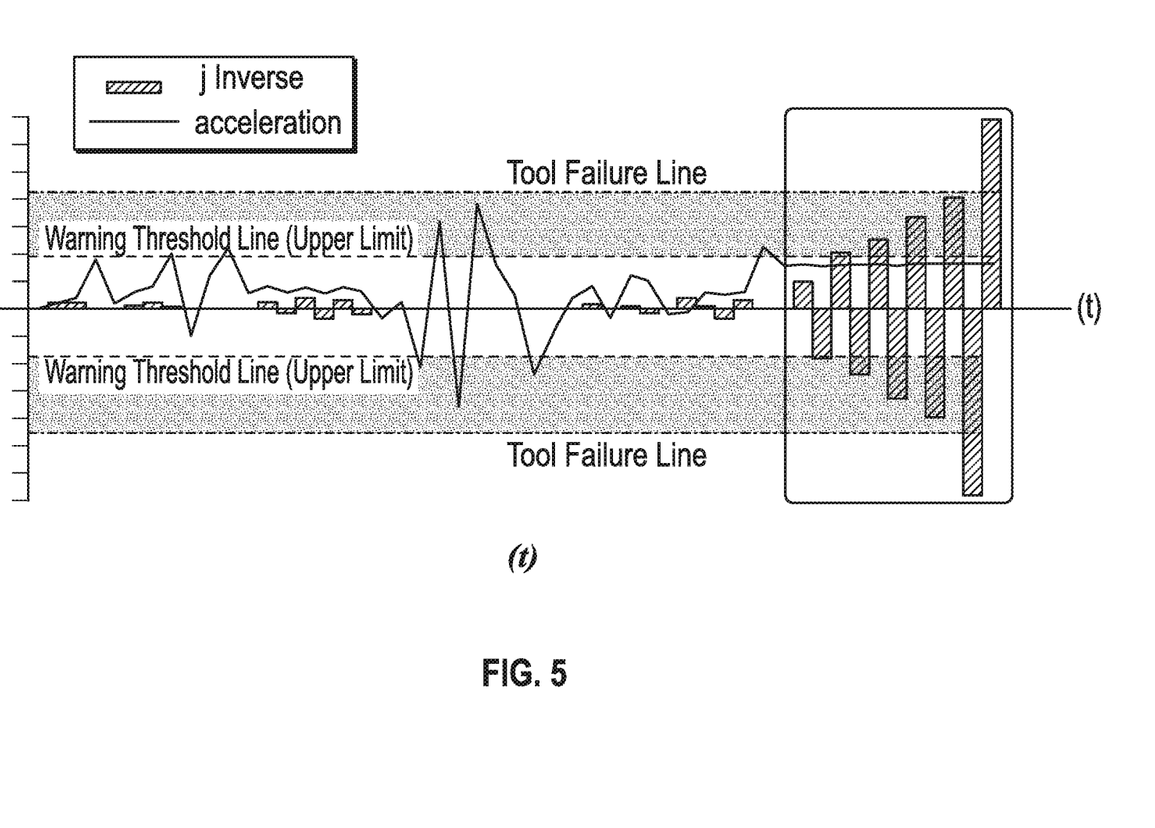
FIG. 5 is a graph illustrating an exemplary plot of the drilling tool(s) failure threshold limits (tool failure lines) and the warning thresholds (warning threshold lines) in step 128 of FIG. 1B superimposed over a combination of the graphs illustrated in FIGS. 4A-4B.

In step 128, the drilling tool(s) failure threshold limits determined in step 126 and warning thresholds, based on the operational cycles and performance baseline for the drilling tool(s) defined in step 106, are plotted on the graph from step 116 (if historical data is not available from prior drilling operations) or the graph from step 124 (if historical data is available from prior drilling operations). In FIG. 5, a graph illustrates an exemplary plot of accelerometer data (acceleration) and inverse jerk values (j inverse) relative to time (t). The graph in FIG. 5 is thus, a combination of the graphs illustrated in FIGS. 4A-4B and further includes the drilling tool(s) failure threshold limits determined in step 126 (tool failure lines) and warning thresholds (warning threshold lines). The drilling tool can be safely operated as long as the inverse jerk values are registered between the upper and lower warning threshold lines. Once inverse jerk values are registered outside the warning threshold lines (shaded area), the drilling tool is at risk of failing within a few time steps. And, once inverse jerk values are registered outside the tool failure lines, the drilling tool will fail completely.

The method 100 combines two powerful approaches (Data Driven Analysis+Engineering) to predict drilling tool failure based on an analysis of at least one of a plot of jerk and inverse jerk for the drilling tool and a plot of drilling tool failure pattern trends data. The method 100 can be used in real-time to adjust drilling operations and for planning purposes before drilling operations commence. While planning before drilling, to facilitate qualitative decisions beforehand without the accelerometer, the method 100 can highlight potential occurrences of drilling tool failure in advance. During real-time operations, values of down-hole tool recordings and other meaningful parameters can be used to match field conditions. The information can then be recorded and compiled to create a comprehensive log of useful datasets for subsequent accuracy improvements during future predictions. The method 100 thus, finds yet another useful application during real-time operations where readings from accelerometers may not be reliable due to hostile operating environments, measurement bandwidth restrictions, circumstances where the accelerometer sensors may have failed or produce faulty readings and/or situations where the signal reception time lag is high enough to warrant lack of immediate usefulness. During the absence of feedback from the drilling tools, the method 100 can be highly effective in predicting drilling tool failure. And, whenever drilling tool failure can be avoided by prediction, substantial resources, time and expense can be saved.

System Description

The present disclosure may be implemented through a computer-executable program of instructions, such as program modules, generally referred to as software applications or application programs executed by a computer. The software may include, for example, routines, programs, objects, components and data structures that perform particular tasks or implement particular abstract data types. The software forms an interface to allow a computer to react according to a source of input. RT WELLPLAN™, which is a commercial software application marketed by Landmark Graphics Corporation, may be used as an interface application to implement the present disclosure. The software may also cooperate with other code segments to initiate a variety of tasks in response to data received in conjunction with the source of the received data. The software may be stored and/or carried on any variety of memory such as CD-ROM, magnetic disk, bubble memory and semiconductor memory (e.g. various types of RAM or ROM). Furthermore, the software and its results may be transmitted over a variety of carrier media such as optical fiber, metallic wire and/or through any of a variety of networks, such as the Internet.

Moreover, those skilled in the art will appreciate that the disclosure may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof, in a computer system or other processing system.

Referring now to FIG. 6, a block diagram illustrates one embodiment of a system for implementing the present disclosure on a computer. The system includes a computing unit, sometimes referred to as a computing system, which contains memory, application programs, a client interface, a video interface, and a processing unit. The computing unit is only one example of a suitable computing environment and is not intended to suggest any limitation as to the scope of use or functionality of the disclosure.

The memory primarily stores the application programs, which may also be described as program modules containing computer-executable instructions, executed by the computing unit for implementing the present disclosure described herein and illustrated in FIGS. 1-5. The memory therefore, includes a drilling tool failure prediction module, which enables steps 110-128 described in reference to FIGS. 1A-1B. The drilling tool failure prediction module may integrate functionality from the remaining application programs illustrated in FIG. 6. In particular, RT WELLPLAN™ may be used as an interface application to perform steps 102-106 in FIG. 1A. Although RT WELLPLAN™ may be used as interface application, other interface applications may be used, instead, or the drilling tool failure prediction module may be used as a stand-alone application.

Although the computing unit is shown as having a generalized memory, the computing unit typically includes a variety of computer readable media. By way of example, and not limitation, computer readable media may comprise computer storage media and communication media. The computing system memory may include computer storage media in the form of volatile and/or nonvolatile memory such as a read only memory (ROM) and random access memory (RAM). A basic input/output system (BIOS), containing the basic routines that help to transfer information between elements within the computing unit, such as during start-up, is typically stored in ROM. The RAM typically contains data and/or program modules that are immediately accessible to, and/or presently being operated on, the processing unit. By way of example, and not limitation, the computing unit includes an operating system, application programs, other program modules, and program data.

The components shown in the memory may also be included in other removable/nonremovable, volatile/nonvolatile computer storage media or they may be implemented in the computing unit through an application program interface ("API") or cloud computing, which may reside on a separate computing unit connected through a computer system or network. For example only, a hard disk drive may read from or write to nonremovable, nonvolatile magnetic media, a magnetic disk drive may read from or write to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above provide storage of computer readable instructions, data structures, program modules and other data for the computing unit.

A client may enter commands and information into the computing unit through the client interface, which may be input devices such as a keyboard and pointing device, commonly referred to as a mouse, trackball or touch pad. Input devices may include a microphone, joystick, satellite dish, scanner, or the like. These and other input devices are often connected to the processing unit through the client interface that is coupled to a system bus, but may be connected by other interface and bus structures, such as a parallel port or a universal serial bus (USB).

A monitor or other type of display device may be connected to the system bus via an interface, such as a video interface. A graphical user interface ("GUI") may also be used with the video interface to receive instructions from the client interface and transmit instructions to the processing unit. In addition to the monitor, computers may also include other peripheral output devices such as speakers and printer, which may be connected through an output peripheral interface.

Although many other internal components of the computing unit are not shown, those of ordinary skill in the art will appreciate that such components and their interconnection are well-known.

While the present disclosure has been described in connection with presently preferred embodiments, it will be understood by those skilled in the art that it is not intended to limit the disclosure to those embodiments. It is therefore, contemplated that various alternative embodiments and modifications may be made to the disclosed embodiments without departing from the spirit and scope of the disclosure defined by the appended claims and equivalents thereof.

The invention claimed is:

1. A computer-implemented method for determining drilling tool failure thresholds, the method comprising:
  receiving a plurality of acceleration values from an accelerometer coupled with a drilling tool disposed within a wellbore;
  calculating a plurality of jerk values and a plurality of inverse jerk values based on the plurality of acceleration values;
  inputting a plurality of subsurface conditions and a plurality of operating conditions corresponding to the wellbore, wherein the plurality of operating conditions are determined using a drilling program;
  generating a graph including the plurality of acceleration values and the plurality of inverse jerk values relative to time;
  receiving historical drilling tool data corresponding to a second wellbore in a geographically similar area;
  performing a simulation on the historical drilling tool data using a data driven model simulation to determine historical drilling tool failure data;
  updating the graph to include the historical drilling tool failure data; and
  determining a plurality of drilling tool failure threshold limits based at least in part on the graph.

2. The method of claim 1, wherein the accelerometer data includes at least one of real-time data and historical data.

3. The method of claim 1, wherein the plurality of jerk values include an axial jerk value, a torsional jerk value, and a lateral jerk value.

4. The method of claim 1, further comprising generating a plurality warning thresholds corresponding to the drilling tool failure threshold limits, wherein the plurality of warning thresholds includes an upper warning threshold and a lower warning threshold.

5. The method of claim 4, wherein the drilling tool failure threshold limit occurs when the plurality of inverse jerk values are outside one or more of the plurality of warning thresholds.

6. The method of claim 5, further comprising adjusting one or more drilling operations of the drilling tool when one or more of the plurality of inverse jerk values is outside one or more of the plurality of warning thresholds.

7. The method of claim 6, wherein the one or more drilling operations are adjusted in real-time.

8. The method of claim 1, wherein the historical drilling tool data includes at least one of prior drilling tool failure logs, drilling tool operating cycles before failure, formation properties, subsurface conditions and historical accelerometer data.

9. The method of claim 1, wherein the data driven model simulation is run using a generalized regression neural networks data driven model.

10. A non-transitory computer-readable storage medium storing computer executable instructions for determining drilling tool failure thresholds, the instructions being executable by one or more processors to implement:
  receive, from an accelerometer, a plurality of acceleration values wherein the accelerometer is coupled with a drilling tool disposed within a wellbore;
  calculate a plurality of jerk values and a plurality of inverse jerk values based on the plurality of acceleration values;
  receive, via an input, a plurality of subsurface conditions and a plurality of operating conditions corresponding to the wellbore, wherein the plurality of operating conditions are determined using a drilling program;
  generate a graph including the plurality of acceleration values and the plurality of inverse jerk values relative to time;
  receive historical drilling tool data corresponding to a second wellbore in a geographically similar area;
  perform a simulation on the historical drilling tool data using a data driven model simulation to determine historical drilling tool failure data;
  update the graph to include the historical drilling tool failure data; and
  determine a plurality of drilling tool failure threshold limits based at least in part on the graph.

11. The non-transitory computer-readable storage medium of claim 10, wherein the accelerometer data includes at least one of real-time data and historical data.

12. The non-transitory computer-readable storage medium of claim 10, wherein the plurality of jerk values include an axial jerk value, a torsional jerk value, and a lateral jerk value.

13. The non-transitory computer readable storage medium of claim 10, wherein the plurality of instructions further cause the processors to display the graph on a graphical user interface.

14. The non-transitory computer-readable storage medium of claim 13, wherein the plurality of instructions further cause the processors to:
  generate a plurality warning thresholds corresponding to the drilling tool failure threshold limits, wherein the plurality of warning thresholds includes an upper warning threshold and a lower warning threshold; and
  overlay the plurality of warning thresholds on the graph displayed on the graphical user interface.

15. The non-transitory computer-readable storage medium of claim 14, wherein the drilling tool failure threshold limit occurs when the plurality of inverse jerk values are outside one or more of the plurality of warning thresholds.

16. The non-transitory computer-readable storage medium of claim 15, wherein the plurality of instructions further cause the processor to adjust one or more drilling operations of the drilling tool when one or more of the plurality of inverse jerk values is outside one or more of the plurality of warning thresholds.

17. The non-transitory computer-readable storage medium of claim 16, wherein the one or more drilling operations are adjusted in real-time.

18. The non-transitory computer-readable storage medium of claim 10, wherein the historical drilling tool data includes at least one of prior drilling tool failure logs, drilling tool operating cycles before failure, formation properties, subsurface conditions and historical accelerometer data.

19. The non-transitory computer-readable storage medium of claim 10, wherein the data driven model simulation is run using a generalized regression neural networks data driven model.

20. A system comprising:
- a well system including a wellbore having a drilling tool disposed therein, the drilling tool having an accelerometer coupled therewith and operable to obtain a plurality of acceleration values;
- one or more processors communicatively coupled with the drilling tool; and
- at least one non-transitory computer-readable storage mediums storing instructions which, when executed by the one or more processors, cause the one or more processors to:
  - receive, from the accelerometer, the plurality of acceleration values,
  - calculate a plurality of jerk values and a plurality of inverse jerk values based on the plurality of acceleration values,
  - receive, via an input device, a plurality of subsurface conditions and a plurality of operating conditions corresponding to the wellbore, wherein the plurality of operating conditions are determined using a drilling program,
  - generate a graph including the plurality of acceleration values and the plurality of inverse jerk values relative to time,
  - receive historical drilling tool data corresponding to a second wellbore in a geographically similar area,
  - perform a simulation on the historical drilling tool data using a data driven model simulation to determine historical drilling tool failure data,
  - update the graph to include the historical drilling tool failure data, and
  - determine a plurality of drilling tool failure threshold limits based at least in part on the graph.

* * * * *